Figure 1:
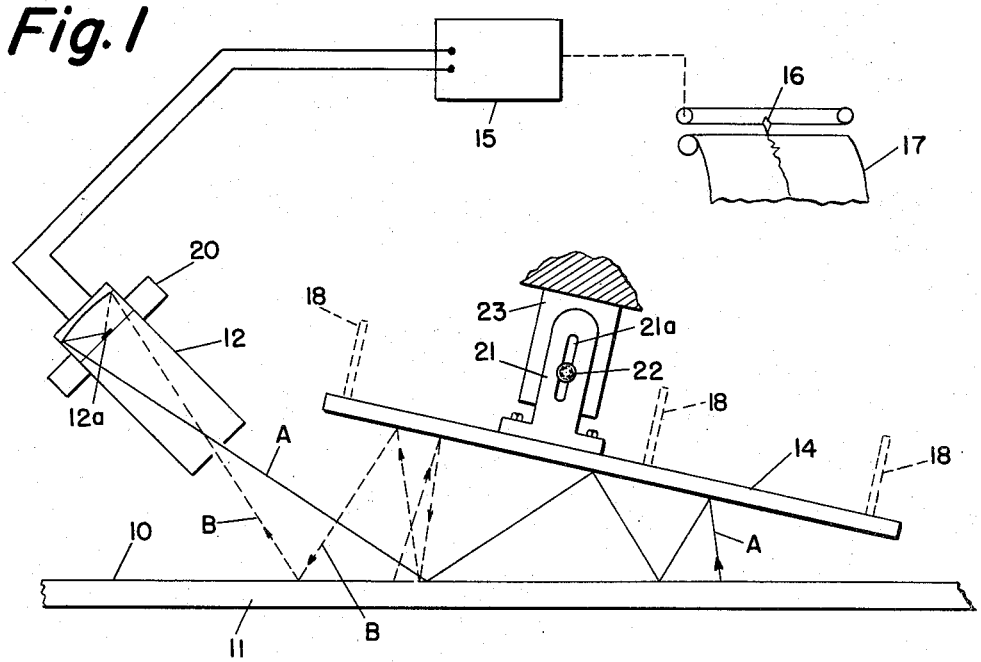

Sept. 28, 1954    W. E. PHILLIPS, JR    2,690,078
RADIATION TEMPERATURE MEASUREMENT
Filed Feb. 7, 1950

INVENTOR.
WILLIAM EARL PHILLIPS, JR.
BY
*Woodcock and Phelan*
ATTORNEYS

Patented Sept. 28, 1954

2,690,078

UNITED STATES PATENT OFFICE 2,690,078

RADIATION TEMPERATURE MEASUREMENT

William Earl Phillips, Jr., Drexel Hill, Pa., assignor to Leeds and Northrup Company, Philadelphia, Pa., a corporation of Pennsylvania Application February 7, 1950, Serial No. 142,807

10 Claims. (Cl. 73—355)

This invention relates to methods of and apparatus for measuring the temperature of a body from which radiant energy is emitted and has for an object the provision of a temperature measuring system of improved accuracy, notwithstanding non-uniform emissivity of the surface of the body whose temperature is to be measured.

Heretofore, the determination in the open of the temperature of a surface of a non-black body by radiant energy responsive means has involved viewing an area of the body with an optical or total radiation pyrometer and introducing or applying an emissivity correction which often is approximate. Measurements made in accordance with the foregoing methods are, in general subject to large errors because of the difficulties in determining the emissivity corrections to be applied. The particular corrections to be made will depend upon the character of the material under measurement and the conditions under which the measurements are made.

The foregoing will be particularly evident by considering a moving body or work surface, such as sheet material in the course of manufacture, new surface areas of which are continuously brought into range of view of a measuring device. The emissivity of such a body or work surface frequently changes in unpredictable manner because of physical differences in different areas of the work surface, changes due to the manufacturing operations, and changes in the surface viewed due to the presence of foreign materials, such as oils, waxes, dirt and the like, having emissivities differing from that of the underlying surface.

A perfect radiator, or black body, is characterized by the fact that the energy which it emits depends only on the temperature of the body. A non-black body radiator emits only a fraction of the energy emitted by a perfect radiator, the fraction being known as the emissivity of the body. The emissivity may refer to only a very narrow spectral range, such as is used in optical pyrometry, or a broad spectral range, such as is used in total radiation pyrometers. Thus, in order to relate the energy emitted by a non-black body to temperature, the emissivity must be known. The emissivity of an opaque body is related to its reflectivity by the equation $E+R=1$. When the emissivity is unity, the reflectivity is zero. However, non-black bodies are partial reflectors and their emissivity can never be unity. The total energy leaving an area of a non-black body surface will, in general, be partly emitted radiation and partly reflected radiation. Reflected radiation can cause temperature-measuring errors. For example, a sheet of white paper in daylight appears red hot when measured with an optical pyrometer. When the total of emitted and reflected radiation at every point in the spectral region to which the pyrometer is sensitive is the same as the radiation at every like point in the same spectral region as would be emitted by a black body at the same temperature, black-body conditions are said to exist.

Since in actual practice the opaque bodies or work surfaces whose temperatures are desired to be measured are not perfect black bodies, it follows that the radiation therefrom will not be due to the temperature of the work surfaces alone, since only a part of the radiation falling on them will be absorbed while the remainder will instead be reflected therefrom. Thus, the total radiant energy from a heated opaque work surface will be made up of two components, one due to emission which will be a fraction of the radiant energy which would be emitted from a black body at the same temperature as the work surface, and the other a reflected component due to the reflection of radiant energy from the work surface. When energy in each and all wavelengths utilized in actuating a radiant energy responsive temperature-measuring means has been made to equal the corresponding energy emitted by a black body at the same temperature as the work surface, black-body temperature-measuring conditions will have been attained.

It is an object of the present invention to provide methods of and apparatus for establishing temperature-measuring conditions approaching black-body conditions for the measurement of the temperature of a work surface.

In carrying out the invention in one form thereof, there is provided a radiant energy reflector so disposed with reference to the work surface as to produce a multiplicity of reflections of radiant energy between the reflector and the work surface to add a reflected component of radiation to the radiation emitted from a limited area of the work surface so that the total effective radiation therefrom will substantially equal the total radiation from a black body at the same temperature as the work surface. By employing a reflector of sufficient area whose reflectivity approaches unity, there is avoided a need to utilize a separate illuminator of the type disclosed in copending application, Serial No. 142,886, filed concurrently herewith by Raymond C. Machler, a co-employee of mine.

For a more detailed description of the invention and for further objects and advantages thereof, reference is to be had to the following description taken in conjunction with the accompanying drawings, in which:

Fig. 1 diagrammatically illustrates one embodiment of the invention; and

Figure 2:
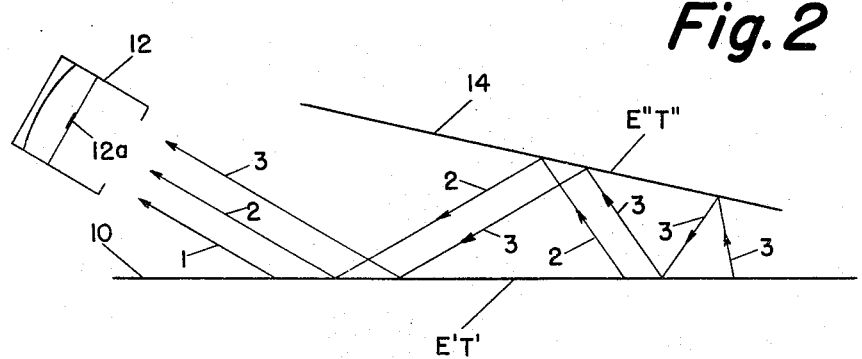

Fig. 2 is a ray diagram explanatory of the operation of Fig. 1.

Referring to the drawings, the invention in one form has been shown and is applied to the measurement of the temperature of the surface 10 of work 11 which may be in the form of a traveling strip of material though the invention is equally applicable to stationary work. The emissivity of the surface 10 will ordinarily be less than unity, and thus, a radiation responsive device, which may be of the type disclosed in Dike Patent 2,232,594, such as a total radiation pyrometer 12 having a sensitive element 12a receiving radiant energy directly from the surface 10 will produce an output which will vary with change in the emissivity of the surface, and as already explained, such variations do occur and cause considerable error. In addition, it is necessary to apply a corrective factor for a given emissivity of the surface 10, the difficulty of applying the correct factor being magnified because of change in the emissivity of different areas of surface 10 viewed by the device 12. However, by locating a radiant energy reflector 14 in such relation to the surface 10 as to produce a multiplicity of reflections of radiant energy between the surface 10 and the reflector 14, there is added to the radiant energy received by the radiation pyrometer 12 a reflection component.

The radiant energy to the radiation pyrometer 12 due solely to that emitted from the surface 10 may be expressed mathematically by the equation:

$$J_{10} = E' J_{T'(BB)}$$

where $E'$ is emissivity of the surface 10, and
$J_{T'(BB)}$ represents the radiant energy from a black body at the temperature $T'$ of work surface 10.

If the reflector were perfect, that is to say, R equal to unity and an infinite number of reflections between the reflector 14 and the surface 10 were utilized to augment the radiant energy received by device 12, black-body conditions will be attained, and the radiation pyrometer 12 can be calibrated in terms of black-body conditions. The response will then be independent of change in emissivity of the surface 10. In accordance with the present invention, there is attained for many useful applications an adequately close approach to the black-body conditions.

The output of the radiation pyrometer 12 has been shown as applied to a measuring and/or control device 15 of the type shown in Squibb Patent 1,935,732 or Williams Patent 2,113,164, arranged to drive an indicator and/or pen 16 relative to a scale or chart 17.

It is to be observed that the radiation receiver or pyrometer 12 is directed to view an area of the work surface 10 included within the multiple reflection zone between it and the reflector 14. That area is defined by two extreme rays of energy entering the radiation receiver 12. One, the ray A, originates from the heated surface, is twice reflected from the reflector 14 and then enters the radiation receiver 12. The other, ray B, originates from the surface 10, is twice reflected from the reflector 14 and then enters the radiation receiver 12. Between these two limiting rays there will be, of course, an infinite number of rays with a greater and a lesser number of reflections between the reflector 14 and the work surface 10. Additional reflected energy may be included in the ray A originating much farther to the right on surface 10 and could include an error component from outside the confines of the reflector 14. However, under ordinary average lighting conditions the error introduced is negligible and is made small by the close spacing from surface 10.

The manner in which the reflector 14 is utilized for the attainment of black-body conditions can be best understood with reference to Fig. 2 where ray A has been illustrated as three separate rays of radiant energy from the surface 10, each of which is directed to the device 12. The ray 1 represents the portion of ray A which is due to radiant energy emitted from the surface 10. The magnitude of ray 1 may be expressed mathematically as follows:

$$J_1 = E' J_{T'(BB)}$$

The ray 1 may likewise be considered as representing the radiant energy from the entire area of surface viewed by the device 12 due to emission of radiant energy therefrom.

The ray 2 represents the radiant energy portion of ray A due to a single reflection from the reflector 14. More particularly, it will be seen that the ray 2 originates from the surface 10, is reflected from the reflector 14 to the surface 10, and is again reflected and directed to the device 12. The magnitude of the radiant energy of ray 2 as first it leaves the surface 10 will, of course, be equal to $E' J_{T'(BB)}$. If the reflectivity of the reflector 14 were unity, the ray 2 after reflection from the reflector 14 would have the same amount of radiant energy as before. As will be later discussed more in detail, the reflectivity of reflector 14 will always be less than unity. Hence, there will be a diminution of the reflected radiant energy which may be expressed by the quantity $(1-E'')$ of the following equation:

$$J_2 = (E' J_{T'(BB)})(1-E'')$$

Similarly, there will be further diminution of the radiant energy of ray 2 as reflected from surface 10 due to the absorption of radiant energy by surface 10. The reduction is expressed by the quantity $(1-E')$ of the following equation which represents the total energy, $J_2$, of ray A directed to the device 12 due to the single reflection from the reflector 14:

$$J_2 = (E' J_{T'(BB)})(1-E'')(1-E')$$

The ray 2 may likewise be considered as representing the radiant energy from the entire area of surface viewed by the device 12 due to a single reflection from the reflector 14.

For rays twice reflected from the reflector 14, it will be seen at once, from Fig. 2 and from the foregoing analysis, that the total energy, $J_3$ of ray 3, may be expressed in the following equation:

$$J_3 = (E' J_{T'(BB)})(1-E'')(1-E')(1-E'')(1-E')$$

The foregoing analysis suggests at once that the disposition of the reflector 14 adjacent the work 10 at an angle with respect thereto produces multiple reflections which add a reflection component of radiant energy to the component of radiant energy due to emission from surface 10. With each additional reflection from the reflector 14 and from the surface 10, the component due thereto decreases. In fact, the series of expressions which indicate the magnitude of each component represent a geometric series.

If there were an infinite number of reflections and the reflector were perfect, the radiation directed to the device 12 would be equal to that emitted by a black body at the temperature of the surface 10. However, it is not necessary to provide for an infinite number of reflections to add an intensity of radiant energy which sufficiently approaches that of a black body at the temperature of surface 10 in terms of the response of the device 12. More particularly, it has been found that a reflector 14 disposed for about two reflections will yield greatly improved accuracy in temperature measurement.

In one form of the invention, the reflector 14 was constructed of polished chromium, 2 inches wide and 3 inches long, the length being the dimension as seen in Fig. 1. The reflector 14 was disposed at such an angle with respect to the surface 10 that the end of reflector 14 adjacent the apex of the angle was one-quarter inch from the surface 10, while the opposite end of the reflector 14 was 1 inch from the surface 10. The dimensions given are to be taken as suggestive of one suitable modification of the invention and not as limiting the invention to such angles or dimensions. The device 12 was supported as by a supporting bracket 20 to view an area of surface 10 receiving the multiple reflections from the reflector 14.

The reflectivity of the polished chromium reflector 14 is of the order of 0.9 for the radiation from a black body at 1000° F. Accordingly, the diminution of each beam reflected thereby was of a very low order, or, stated differently, the component due to a few reflections from the reflector 14 is relatively high in value compared with the magnitude of a like component which would be reflected from a reflector having a low value of reflectivity. In terms of design, the higher the reflectivity of the reflector 14, the smaller may be its dimensions for a given magnitude of reflected component of energy to the device 12.

With a high reflectivity of reflector 14, there is, of course, a corresponding decrease in its absorptivity (numerically equal to its emissivity), and thus there is avoided adverse effects due to any marked difference in the temperature of the reflector 14 and that of the surface 10. Theoretically, if the reflector 14 is a perfect reflector, the temperature thereof would in no way affect the intensity of the radiant energy applied to the surface 10 by the reflector since no radiant energy would be emitted therefrom regardless of its temperature. It may be desirable to cool the reflector in some instances to prevent the reflector from becoming tarnished in instances where the ambient temperature tends to be too high. Such a cooling means may take the form of heat-conducting and heat-radiating fins 18 shown by broken-lines in Fig. 1.

The number of reflections may be increased for a given size of reflector 14 by lowering the reflector 14 relative to the surface 10, and such operation may be provided for by an elongated slot 21a in a bracket 21 supporting the reflector 14 and anchoring it in place by means of a clamping bolt 22 extending from a stationary support 23. The number of reflections may also be increased by decreasing the angle between reflector 14 and the surface 10. Thus, if the reflector 14 be rotated about the bolt 22 until there is zero angle (it may also be considered parallel to surface 10 or an angle of 180° with respect thereto), the maximum number of reflections will be attained. However, for convenience in locating the radiation responsive device 12, the arrangement of Fig. 1 will in many cases be preferred. The number of reflections building up the radiant energy to device 12 may also be varied by changing the sighting angle of the device 12.

It is to be further understood that polished chromium need not be used as the material of the reflector 14, though it is to be understood that it is desirable to have a reflector material having a high-reflectivity. As the reflectivity of the reflector 14 decreases, it will be desirable to increase the dimensions of the reflector 14 to provide an added number of reflections to add to the magnitude of the reflected component. However, the higher the reflectivity of the reflector 14, the better. It will also be necessary to increase the area of the reflector 14 when measuring the temperature of a surface 10 having low emissivity, inasmuch as the radiant energy due to emissivity will, of course, be correspondingly decreased, and the required component reflected from surface 10 must be increased. In order to increase the reflected component, other conditions remaining unchanged, it is necessary to obtain a larger number of reflections by increasing the area of the reflector.

The foregoing can also be explained by consideration of the terms of the equations earlier referred to. If the emissivity of the surface 10 is 0.9 and the component due to reflection is 0.09, the radiant energy directed to the device 12 will be 99% of the radiation from a black body at the same temperature as that of the surface 10. If it be assumed that the reflectivity of the reflector 14 is unity in the foregoing numerical example, it will be seen that the 99% response can be attained with a single reflection from the reflector 14. However, if the emissivity of the surface 10 is 0.5, again assuming the reflectivity of unity for reflector 14, the magnitude of the component due to a single reflection by reflector 14 will be of the order of 0.25, since half of the energy reflected from the reflector 14 will be absorbed by the surface 10. Thus, a ray twice reflected by reflector 14 will have a value of 0.125; a thrice reflected ray, 0.0625. With five reflections from reflector 14, the radiant energy directed to the device 12 will be approximately 98.4% of the radiation from a black body at the temperature of the surface 10.

With the foregoing understanding of the invention, it will be apparent to those skilled in the art how various reflectors 14 may be dimensioned and disposed with respect to a surface whose temperature is to be measured in order to take advantage of the present invention, the scope of which is set forth in the appended claims.

What is claimed is:

1. A system for measuring the temperature of a body from which radiant energy is emitted, the emissivity of said body being less than unity, means for establishing conditions of measurement approaching black-body conditions comprising a reflector having a reflectivity approaching the value of unity disposed closely adjacent said body at an angle thereto for intercepting radiant energy emitted therefrom and for multiple reflection of the intercepted energy between said body and said reflector, and radiation responsive means disposed at an acute angle with respect to said body to respond to the combined emitted and multiply reflected energy resulting from said association of said reflector and said body.

2. In a system for measuring the temperature of a heated body from which radiant energy is emitted, means for producing a beam of radiant energy of intensity approaching that from a black body at the temperature of the heated body, comprising a reflector having a reflectivity approaching the value of unity disposed closely adjacent the heated body at an acute angle thereto for multiple reflection of radiant energy therebetween, said angle and the length of said reflector being such as to produce for a selected ray at least one reflection thereof, and radiation responsive means disposed along the angle of reflection of the multiple reflected rays and disposed to view an area of the work surface within the area of multiple reflection between said work surface and said reflector.

3. In combination, means for producing blackbody conditions of measurement for a body having an emissivity less than unity and at a temperature for radiation of energy therefrom, which comprises a radiant energy reflector having a reflectivity approaching the value of unity disposed at an acute angle less than about 45° with respect to the body for producing a multiplicity of radiant energy reflections therebetween, and radiant energy measuring means disposed at an acute angle with respect to said body to respond to the radiant energy from said body supplemented by said multiple reflections.

4. A system calibrated with respect to radiant energy emitted from a surface having an emissivity of substantially unity for determining the temperature of an opaque work surface having an emissivity less than unity, comprising radiation-receiving means disposed to receive a radiant energy beam from a limited area of said opaque work surface, said beam comprising a component of radiant energy emitted from said limited area and a component of radiant energy reflected from said limited area, a reflector disposed in closely spaced relation with respect to said opaque work surface for multiply reflecting radiant energy from said opaque work surface to said limited area for reflection from said limited area of radiant energy of a magnitude which increases the sum of said emitted and reflected components of said beam substantially to equal the intensity of a beam which would be emitted by said limited area were the emissivity thereof unity, said reflector having a reflectivity of approximately unity and with a corresponding low emissivity in avoidance of change in the magnitude of said reflected component due to the temperature of said reflector, adjustable supporting means for supporting said reflector in closely spaced relation with respect to said opaque work surface and for varying the angular position of said reflector with respect to said work surface independently of the angular disposition of said radiation-receiving means for varying the number of reflections building up the radiant energy received by said radiation-receiving means, and means connected to said radiation-receiving means for indicating the temperature of said opaque surface.

5. A system calibrated with respect to radiant energy emitted from an opaque surface having an emissivity of substantially unity for determining the temperature of an opaque work surface having an emissivity less than unity, comprising radiation-receiving means disposed at an acute angle with respect to said opaque work surface to receive a radiant energy beam from a limited area of said opaque work surface, said beam comprising a component of radiant energy emitted from said limited area and a component of radiant energy reflected from said limited area, a substantially temperature independent reflector disposed in closely spaced relation with respect to an extended area of said opaque work surface adjacent said limited area for multiply reflecting radiant energy from said extended area of said opaque work surface to said limited area for reflection from said limited area of radiant energy of a magnitude which increases the sum of said emitted and reflected components of said beam substantially to equal the intensity of a beam which would be emitted by said limited area were the emissivity thereof unity, said reflector having a reflectivity above 0.6, adjustable supporting means for supporting said reflector directly adjacent said opaque work surface and for varying the spacing therebetween to vary the number of reflections between said reflector and said work surface building up the radiant energy received by said radiation-receiving means, and a measuring circuit including said radiation-receiving means for measuring the temperature of said opaque surface as a function of the sum of said components of radiant energy.

6. A method for measuring the temperature of an opaque body having an emissivity less than unity which comprises intercepting a radiant energy beam from a limited area of said opaque body by a radiation receiving means, said beam comprising a component of radiant energy emitted from said area and a component of radiant energy reflected from said area, multiply reflecting radiant energy from said opaque body between a reflector and said opaque body to said area for reflection from said area of radiant energy of a magnitude which increases the sum of said emitted and reflected components of said beam substantially to equal the intensity of a beam which would be emitted by said area were the emissivity thereof unity, said reflector having a reflectivity of approximately unity and with a correspondingly low emissivity in avoidance of change in the magnitude of said reflected component due to the temperature of said reflector, and measuring the output of said radiation-receiving means to determine the temperature of said opaque body as related to the sum of said components of radiant energy.

7. A system for measuring the temperature of a body from which radiant energy is emitted including radiation-responsive means disposed at an acute angle with respect to said body for receiving emitted and reflected components of radiant energy from a limited area of said body, and means for establishing conditions of measurement approaching black-body conditions, comprising reflecting structure disposed closely adjacent an extended area of said body for receiving from said extended area radiant energy to be multiply reflected between said body and said structure, said reflecting structure being so disposed with respect to said body and said radiation-responsive means as to direct the multiply reflected radiant energy to said limited area of said body for reflection therefrom at said acute angle to said radiation-responsive means along with the emitted component of radiant energy emitted from said limited area at said acute angle, said reflected component of radiant energy being derived substantially solely from the radiant energy emitted from said extended area of said body.

8. A system according to claim 7 wherein said reflecting structure has a reflectivity approaching the value of unity.

9. A system according to claim 8 wherein said reflecting structure is a substantially plane reflector.

10. A system according to claim 9 wherein the position of said reflector is adjustable with respect to said radiation-responsive means and said body to vary the number of reflections between said reflector and said body building up the radiant energy received by said radiation-receiving means.

References Cited in the file of this patent

UNITED STATES PATENTS

| Number | Name | Date |
|---|---|---|
| 919,399 | Thwing | Apr. 27, 1909 |
| 1,891,039 | Barton | Dec. 13, 1932 |
| 1,900,779 | Thwing | Mar. 7, 1933 |
| 2,366,285 | Percy et al. | Jan. 2, 1945 |
| 2,562,538 | Dyer | July 31, 1951 |

FOREIGN PATENTS

| Number | Country | Date |
|---|---|---|
| 621,882 | Great Britain | Apr. 21, 1949 |